US012594863B1

(12) United States Patent
Broadhead et al.

(10) Patent No.: US 12,594,863 B1
(45) Date of Patent: Apr. 7, 2026

(54) SYSTEM FOR MITIGATING THE SEVERITY OF MOTOR VEHICLE CRASHES

(71) Applicant: Automotive Safety Research, Inc., Santa Barbara, CA (US)

(72) Inventors: William Broadhead, Santa Barbara, CA (US); Ted Zinke, Santa Barbara, CA (US)

(73) Assignee: Automotive Safety Research, Inc., Santa Barbara, CA (US)

( * ) Notice: Subject to any disclaimer, the term of this patent is extended or adjusted under 35 U.S.C. 154(b) by 0 days.

(21) Appl. No.: 19/275,902

(22) Filed: Jul. 21, 2025

(51) Int. Cl.
    *B60N 2/427*     (2006.01)
    *B60N 2/42*     (2006.01)

(52) U.S. Cl.
    CPC ....... *B60N 2/42736* (2013.01); *B60N 2/4221* (2013.01); *B60N 2/4279* (2013.01)

(58) Field of Classification Search
    CPC . B60N 2/42736; B60N 2/4221; B60N 2/4279
    See application file for complete search history.

(56) References Cited

U.S. PATENT DOCUMENTS

| | | | |
|---|---|---|---|
| 6,053,571 A | 4/2000 | Faigle | |
| 6,394,535 B1 | 5/2002 | Kawamura et al. | |
| 6,422,632 B1 * | 7/2002 | Kamei | 296/68.1 |
| 6,824,187 B2 | 11/2004 | Motozawa et al. | |
| 6,843,504 B2 | 1/2005 | Motozawa | |
| 8,434,819 B2 | 5/2013 | Guerrero | |
| 10,112,511 B2 | 10/2018 | Frommann et al. | |
| 10,434,906 B2 | 10/2019 | Frommann et al. | |
| 11,667,216 B2 | 6/2023 | Ribero et al. | |
| 11,712,983 B2 | 8/2023 | Ribero et al. | |
| 2005/0012013 A1 | 1/2005 | Dill et al. | |
| 2011/0074190 A1 | 3/2011 | Hashimoto | |
| 2013/0201053 A1 | 8/2013 | Saing | |
| 2020/0173519 A1 | 6/2020 | S. | |
| 2020/0238855 A1 | 7/2020 | Seib et al. | |
| 2022/0048406 A1 | 2/2022 | Ribero et al. | |
| 2022/0234475 A1 | 7/2022 | Andrews et al. | |

OTHER PUBLICATIONS

US 11,628,750 B2, 04/2023, Ribero et al. (withdrawn)

* cited by examiner

*Primary Examiner* — Anthony D Barfield
(74) *Attorney, Agent, or Firm* — SoCal IP Law Group LLP; Steven C. Sereboff; Jonathan P. Gutierrez

(57) ABSTRACT

A system that reduces forces imparted to a vehicle occupant in a collision, including a seat and integrated seatbelt system, a slider mechanism along which the seat can be moved rapidly, a device to provide extremely rapid acceleration of the seat along the slider mechanism, and a mechanism to resist seat motion opposite to that of the impact force in an energy absorbing fashion. Prior to a crash, a precisely timed high rearward force is applied to the seat resulting in acceleration of the seat and occupant relative to the vehicle. Once the seat reaches its travel limit in the direction of crash forces, as a result of crash accelerations, it then reverses direction and an energy absorption mechanism mitigates the forces applied to the occupant. Accelerations that would otherwise be experienced by the vehicle occupant due to the collision are reduced.

21 Claims, 15 Drawing Sheets

THRUST DIRECTION

THRUST PHASE

ENERGY ABSORPTION PHASE

Dummy Chest Gs

Actual Data: Without Invention

Hypothetical: With the Invention

Time - Milliseconds

G's

Precrash Pulse and Crashpulse (c) 2025 Automotive Safety Research, Inc.

t = -50 msec t = 0 msec

156

130

CD

122

138

G

0"

10"

0"

128

150

(t = +40 msec)

t = +160 msec

Crash Test Results - 30 mph Delta V Impact
Occupant Chest Acceleration

SYSTEM FOR MITIGATING THE SEVERITY OF MOTOR VEHICLE CRASHES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to systems for mitigating the severity of motor vehicle crashes and methods of operation.

Description of the Related Art

U.S. Pat. No. 10,434,906 assigned to General Motors discloses a motor vehicle with a front vehicle seat 2 mounted on the vehicle body 1 such that, in case of a crash, it can be adjusted on guide rails from a front end of the vehicle to a tail end of the vehicle in an adjusting direction extending in a longitudinal vehicle direction. A controlled actuator 4 exerts forces upon the front vehicle seat 2 in the longitudinal vehicle direction. An imminent collision of the motor vehicle is detected, and the actuator is driven in order to accelerate the loading area in the adjusting direction prior to the imminent collision.

U.S. Pat. No. 10,434,906 focuses on adjusting the seat position rearward before the crash so that it, and the occupant, can dissipate kinetic energy as the seat is subsequently allowed to move forward under a controlled resistive force during the crash event. While this may be an improvement in current occupant restraint technology, it does NOT properly address the opportunity to effectively dissipate occupant kinetic energy during the Precrash and early stages of the actual crash. For example, it ignores the importance of strategically creating and implementing a powerful Precrash Pulse, in shape, magnitude and timing. To be effective, any Precrash acceleration of the seat must be properly timed. If applied too early, it will not effectively dissipate occupant energy and may cause an abrupt and potentially injurious stoppage of the seat motion as it runs out of available excursion distance (for example, whiplash). If applied too late, significant opportunity for "Ridedown" will be lost and peak occupant accelerations may actually increase.

Other similar systems have been proposed, but despite many attempts a reliable system for predicting and preempting the forces associated with an impending crash before the crash begins has yet to be deployed in the market.

SUMMARY OF THE INVENTION

A system that reduces the severity of forces imparted to a vehicle occupant involved in a collision, including a vehicle seat (a seat cushion, seat back, headrest and integrated seatbelt system), a slider mechanism by which the seat can be moved rapidly along the direction of impact force, a device to provide extremely rapid acceleration of the seat in the direction of the impending impact forces, and a mechanism by which seat motion opposite to that of the impact force is resisted in an energy absorbing fashion. Prior to an impending impact, a precisely timed high force is applied to the seat resulting in acceleration of the seat and occupant relative to the vehicle. Once the seat has translated near to its limit of excursion in the direction of crash forces it can then reverse its direction (as a result of the vehicle crash accelerations) whereby energy absorption mechanism such as shown herein continue to mitigate the forces applied to the occupant. The objective of the invention is to attenuate (reduce) the accelerations that would otherwise be experienced by the vehicle occupant due to the collision.

As envisioned in the present application, the vehicle seat is rapidly accelerated in the direction of the predicted crash forces at a precise time just prior to the crash impact. The timing of the seat translation is to be such that it results in reduced vehicle occupant accelerations later in the impact event.

The system disclosed herein includes a Computer Algorithm to calculate an optimized (and timed) Precrash Pulse, a vehicle seat (a seat cushion, seat back, headrest and integrated seat belt system (sometimes referred to as "All Belts to Seat")), devices to provide the Precrash Pulse to the seat, and mechanisms to provide adjustable force limiting energy absorption after the seat has reversed its direction of travel and subsequently moves forward relative to the vehicle. Prior to an impending impact, a strategically calculated and timed Precrash Pulse is applied to the seat(s) resulting in seat acceleration that acts in concert with the vehicle Crash Pulse to attenuate (reduce) the peak accelerations that would otherwise be experienced by the vehicle occupant due to the collision.

Prior art and previously proposed concepts of adjusting the seat rearward envisioned that the seat movement would take place and be completed prior to the onset of the collision. The disclosed system is new and distinct from previous precrash mitigation systems in that here, with proper timing, the actual Crash Pulse works in CONCERT with the Precrash Pulse to reverse the direction of seat travel, all the while dissipating occupant kinetic energy. A Computer Algorithm uses the predicted Time of Impact (TOI) and the expected crash severity to strategically dictate the Precrash Pulse Timing Offset (when to actuate the Precrash Pulse prior to the onset of the collision) and nature of the Precrash Pulse to be applied to the seat. The Precrash Pulse is initiated before the TOI and typically, but not necessarily, partially overlaps the vehicle Crash Pulse. This dramatically reduces the severity of the anticipated Crash Pulse acting on the occupants by replacing it with a much milder overall acceleration curve.

The disclosed system draws upon data from a Crash Prediction System (not part of the disclosed system) capable of detecting an impending collision, predicting the TOI and predicting the severity and nature of the collision. Crash prediction systems have been implemented in many vehicles and are being used to apply the brakes or actuate other safety systems prior to a crash. As crash prediction technology improves, sensing systems will evolve to better predict what the vehicle is about to impact, the expected impact speed and angles of impact, structural offsets and other pertinent data. Existing sensors and cameras currently used on various vehicles may already be suitable for this task. They will likely evolve along with algorithms to provide enhanced input to the disclosed system.

Based on input from the Crash Prediction System, the disclosed system's Computer Algorithm quickly determines the appropriate timing and characteristics of the Precrash Pulse. This ensures that the Precrash Pulse works in concert with the impending Crash Pulse in a timely manner to optimize the available seat travel distance and to guarantee that the vehicle Crash Pulse reverses the seat direction before it reaches the maximum extent of its available travel.

The Computer Algorithm input parameters will include but not necessarily be limited to: The available seat travel distance, the combined weight of the occupant and seat, the predicted Time of Impact (TOI), available Variable Force Thruster System (VFTS) force profiles, available Force Limiting profiles, and the severity and nature of the predicted Crash Pulse. While many variations of computer code may be used to solve this dynamics calculation, the solution must ultimately determine the characteristics of the Precrash Pulse and Force Limiting, and when to initiate the Precrash Pulse. The Computer Algorithm may solve the applicable equations of motion directly or by incorporating an iterative process.

The disclosed system components apply force to the seat during the initial precrash phase and later after the influence of the Crash Pulse has slowed and eventually reversed the initial movement of the seat relative to the vehicle. The calculated Precrash Pulse is implemented by a Variable Force Thruster System (VFTS) for each occupant seating system. The VFTS(s) components are constructed to allow multiple levels of force commensurate with the expected crash severity. The Precrash Pulse Timing Offset and level of force acting on the seat via the VFTS are commensurate with the severity of the expected crash.

The forcefulness of the VFTS may also be adjusted depending on other factors. Such factors may include, but not necessarily be limited to, occupant biometrics such as weight, height, gender, age, and other such biometric parameters.

In that preferred embodiment, there are thruster systems arranged under each of the two front seats, and potentially the rear seats, such that the system response has adjustable degrees of force that increase with the predicted crash severity for optimum occupant injury mitigation.

Various methods of providing seat thrust force are contemplated, including but not limited to piston-cylinder devices or other means of force application that utilize pyrotechnic and/or stored gas, hydraulic, pneumatic, solenoid, or stored mechanical energy to name just a few. In one embodiment of the disclosed system, multiple thrusters or actuators may be utilized for each of the vehicle seats. These thrusters are configured to provide the Precrash Pulse as the control system actuates one, two, or more thrusters depending on the magnitude of the crash expected. That is, sensors on the vehicle detect an impending crash and the predicted severity and nature of the impact, and the disclosed system's Computer Algorithm immediately calculates when to actuate one or more of the thrusters. In one preferred embodiment, there are three thrusters arranged under each of the two front passenger seats, and potentially the rear seats, such that the system response has three potential degrees of thrust-a mild crash triggers actuation of one thruster, a medium crash triggers two thrusters, and a severe crash triggers all three thrusters for maximum crash mitigation. Additionally, the thrusts may not necessarily be triggered simultaneously. A wide range of Precrash Pulse shapes may be obtained by staged firing of the thrusters.

Because the determination of the appropriate Precrash Pulse and the level of Force Limiting seat movement are both governed primarily by the predicted severity of the imminent collision, the level of Force Limiting may be directly tied to the forcefulness of the Precrash Pulse. For example, the system may be designed such that a discrete level of rearward translational force applied to the seat will result in an associated discrete level of subsequent Force Limiting forward movement. As the example, FIG. 2B illustrates multiple levels of rearward thrust and forward translation Force Limiting energy absorption that can be applied to the seat such that they are commensurate with the predicted crash severity.

In another embodiment, the disclosed system may utilize a single thruster that is also capable of providing varying levels of force commensurate with the predicted severity and nature of the impact. For example, a powerful solenoid(s) may be used to provide a controlled level of thrusting force. Other means of single thruster systems are contemplated.

Prior to the maximum allowable displacement of the seat, the vehicle Crash Pulse and its influence will eventually cause the seat and occupant to reverse direction relative to the vehicle. The proposed system also incorporates a mechanism to attenuate the final movement of the seat as it moves in a direction opposite to that of the initial movement relative to the vehicle. After the reversal of the seat's initial direction of travel, a controlled restraining force is applied to the seat. This is accomplished by way of adjustable energy absorbing Force Limiting applied to the seat which serves to further dissipate occupant energy and to bring the seat to a final stop relative to the vehicle.

The system efficiently and dramatically reduces the forces ultimately sustained by an occupant involved in a crash. It does so by rapidly accelerating the occupant and seat in the direction of the predicted crash forces before the crash begins. This is not merely a precrash seat adjustment, but rather a high G preemptive and controlled acceleration of the occupant.

Features Include:

A strategically controlled Precrash Seat Acceleration System precisely timed to WORK IN CONCERT with a predicted vehicle Crash Pulse, so as to maximize effective occupant stopping distance and thus mitigate crash related forces acting on the occupant.

The term "track or rail system" means a system of Tracks, Guides, Rails, Sliders, Linear Bearings or other means of controlling or constraining Occupant Seat motion (Linear and rotational) along a pathway within a vehicle.

This System may rely on Original Equipment Manufactures (OEM) Belt Integrated Occupant Seats also known as All Belts to Seats.

The system has a Variable Force Thruster System (VFTS) that can deliver a strategically planned Acceleration Pulse with precise timing, shape and magnitude to an Occupant Seat.

The system may have a Variable Force Seat Braking System that absorbs Occupant and Seat Kinetic Energy after reversal of seat direction (relative to the vehicle).

The system may have a means of locking the final Seat position (after the Impact) that may or may not be independent of the Variable Force Braking System.

The system may have a control system that signals the VFTS exactly when to initiate the strategically planned Seat Acceleration Pulse.

The system has a Computer Program/Algorithm that crafts (by calculation of the appropriate Equations of Motion mathematically or uses an Iterative Process) the appropriate Acceleration Pulse (in magnitude, shape, amplitude and timing) sent to the control system and ultimately the VFTS.

Input variables used by the Computer Program/Algorithm include but are not necessarily limited to the predicted Time of Impact (TOI), the predicted Crash Pulse severity (Magnitude, direction, and shape), Seat Belt In-Use status, the maximum available seat translation distance, and the combined weight of the Occupant(s) and seat. These Inputs will be provided by OEM sensors and systems that are not necessarily a part of the Invention herein.

The Computer Program/Algorithm preferably dictates that the Precrash Acceleration Pulse works in Concert with the actual Crash Pulse to minimize the overall Occupant Forces and to guarantee that the Occupant Seat stops and reverses direction (relative to the vehicle) before it reaches its predefined limits of excursion.

The Occupant Injury Mitigation System described herein is unique in concept and design in that it absorbs Occupant Kinetic Energy while the Seat moves BOTH rearward and forward in the Occupant Compartment.

Interference Fit Bearings in the Piston/Cylinder assembly freely roll as the seat moves rearward yet creates high resistance to forward movement.

The system effectively reduces frontal crash severity to the level of a crash less than half the actual crash Speed (Delta Velocity).

The System may substantially reduce Side Impact severity.

The system preferably moves occupants out of the dangerous deployment path of deploying airbags.

The System may benefit rear seat passengers by providing an energy absorbing seat to their proximity in frontal accidents The system may greatly expands the time window in which Airbags may safely deploy.

The Thruster System may provide Mechanical Advantage in two directions of piston travel.

DETAILED DESCRIPTION

Figures 1, 2A, 2B, 2C, 2D:
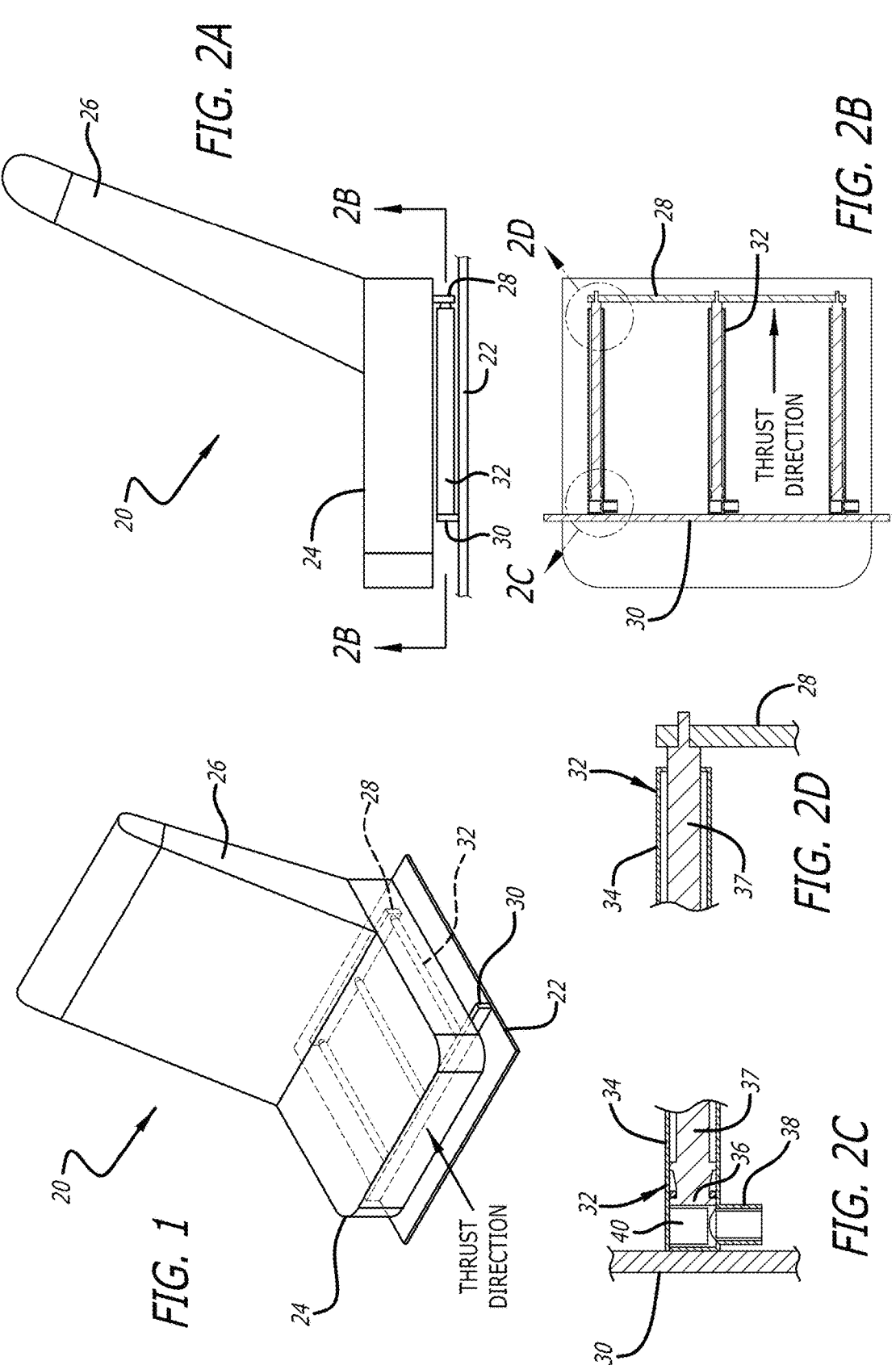
FIG. 1 is a schematic perspective view of an exemplar configuration of the Variable Force Thruster System (VFTS) and Force Limiting system.
FIGS. 2A-2D are orthogonal and detailed views of various exemplar components of the vehicle seat of FIG. 1 adapted with an exemplar configuration of the crash mitigation system described herein.

Principle of Operation of the Disclosed System Concept

The foundational principle of operation of the disclosed system is illustrated in the following frontal impact example:

Just prior to an impending frontal collision, the seatbelt pretensioner may be actuated and shortly thereafter the seat and Occupant are propelled rearward. (Note: The system also works without a seatbelt pretensioner, but not as effectively). As the seat moves rearward, it accrues a velocity relative to the vehicle as well as a reduced velocity relative to the ground. During the seat's movement, the vehicle impact then ensues resulting in the vehicle also accruing a change in velocity. With precise timing of the seat rearward propulsion, there comes a point, prior to the seat reaching a predetermined maximum allowable displacement relative to the vehicle, at which the vehicle's velocity will match that of the seat.

At that point, the seat's rearward movement relative to the vehicle stops (before reaching maximum allowable displacement). Subsequent forward movement, caused by the vehicle Crash Pulse, is then allowed under the governance of an energy absorbing restraining force, termed Force Limiting. The seat forward movement restraining force acts as an additional kinetic energy dissipator for the seat and belted occupant.

The disclosed system uses a predicted TOI and predicted Crash Pulse to compute the optimum Precrash Pulse Timing Offset and force profile of the Precrash Pulse to begin occupant Injury mitigation before the actual crash has begun. Along with actuation of the Precrash Pulse and seatbelt pretensioners, the vehicle's airbags may subsequently be actuated earlier than in vehicles without this system. This will improve the overall effectiveness of current restraint systems and reduce the chance of airbag induced occupant injury.

This application is not limited to frontal collisions, but rather applies to all crash Force Vectors in the three Linear Coordinate (X, Y, Z) directions, as well as three Orthogonal RotationalDegrees of Freedom (Pitch, Yaw and Roll) so as to include all impacts in three-dimensional space.

Required Input parameters for the disclosed system are: The precisely predicted Time of Impact (TOI) and the anticipated severity and nature of the crash in terms of Linear (and perhaps Rotational) Accelerations (commonly known as the Crash Pulse).

The disclosed system does not include a Crash Prediction System or the hardware to predict crash parameters. However, the data generated by an appropriately sophisticated Crash Prediction System is used by the disclosed system's Computer Algorithm for timely initiation of the seat movement apparatus.

Single Axis Frontal Impact Example: This example demonstrates how the system effectively reduces the occupant's forward velocity relative to ground and substantially reduces the occupant's peak accelerations and other injury measures.

Once an imminent Frontal Crash is predicted, an "ALL Belts to Seats" seatbelt pretensioner-system is actuated, effectively linking the occupant to the seat. Then at a precisely calculated time, a Precrash Pulse is applied to the seat that accelerates it rearward relative to the vehicle at levels appropriate for the predicted Crash Pulse.

A timed and properly managed application of the Precrash Pulse ensures that before the seat and occupant have reached the maximum allowable rearward seat excursion (limited by the vehicle dimensions and/or presence of a rear seat occupant), the influence of the Crash Pulse has reduced the seat rearward velocity relative to the vehicle so that it does not experience an abrupt stop at the maximum allowable rearward travel. Once the seat has reached its rearmost excursion (which occurs when both the seat and vehicle have reached a common velocity), it may then move forward in the occupant compartment under controlled Force Limiting and thus absorb even more kinetic energy.

The above examples are simplified down to one Degree of Freedom (The X direction) in a Cartesian Coordinate system for illustration purposes only and shall not be construed to limit the more universal scope of the disclosed system. It will, as an example, be effective in vehicle side impacts, rear impacts, and aviation crashes as well as other real-world crashes.

FIG. 1 is a schematic perspective view of an exemplary configuration of the Variable Force Thruster System (VFTS) and Force Limiting system. It shows a vehicle seat 20 indicating a stationary floor 22 underneath and a direction of thruster force applied to the seat to mitigate crash forces. "Stationary" in this context meaning relative to the moving car in which the seat is mounted. FIGS. 2A-2D are orthogonal and detailed views of various components of the vehicle seat 20 of FIG. 1 adapted with a schematic configuration of the crash mitigation system described herein.

The vehicle seat 20 comprises a generally horizontal lower seat cushion 24 and an upwardly angled seat back 26. The seat 20 is supported on a seat framework 28 which is only partially shown and is movable on tracks or rails with respect to a fixed floor framework 30 (again, only partially shown) mounted to the vehicle floor 22. One or more thrusters 32 are aligned in the thrust direction between the moving and fixed frameworks so as to displace the seat framework 28 relative to the floor framework 30. Actuation of one or more of the thrusters 32 transmits force in the thrust direction to the seat framework 28 which displaces the seat 20 in the same direction, which is rearward from the perspective of a person on the seat 20.

It should be understood that the tracks or rails between frameworks 28, 30 on which the seat 20 is propelled by the thrusters 32 may be integrated into an existing seat position adjustment system or may be separate. That is, vehicle seats are universally provided with sliding tracks to adjust the distance between the seat and the dashboard for different sized people. A separate track or rail system for implementing the thrust system of the present application may be provided in parallel with this existing seat adjustment system. For example, a first set of tracks or rails can be mounted to the vehicle floor and used for the crash mitigation system herein, while the existing seat adjustment system can be mounted (i.e., layered) on top of that.

The enlarged views of FIGS. 2C and 2D schematically show opposite ends of the thrusters 32. Each of the thrusters 32 comprises an outer cylinder 34 within which a piston 36 having an integral rod 37 reciprocates. On the front end, the cylinder 34 mounts to the fixed floor framework 30. A source of sudden pressurization (not shown) is supplied and coupled to an inlet 38 which opens to a chamber 40 within the cylinder 34 adjacent a first end of the piston 36. Pressurization of the chamber 40 propels the piston 36 in the thrust direction, or to the right in FIG. 2C. At the back end of the thruster 32, the piston 36 emerges from a sealed aperture in the cylinder 32 and mounts to the seat framework 28. Displacement of the piston 36 in the thrust direction, or to the right, propels the seat framework 28 and thus the seat 20 in the thrust direction.

Figures 3A, 3B:
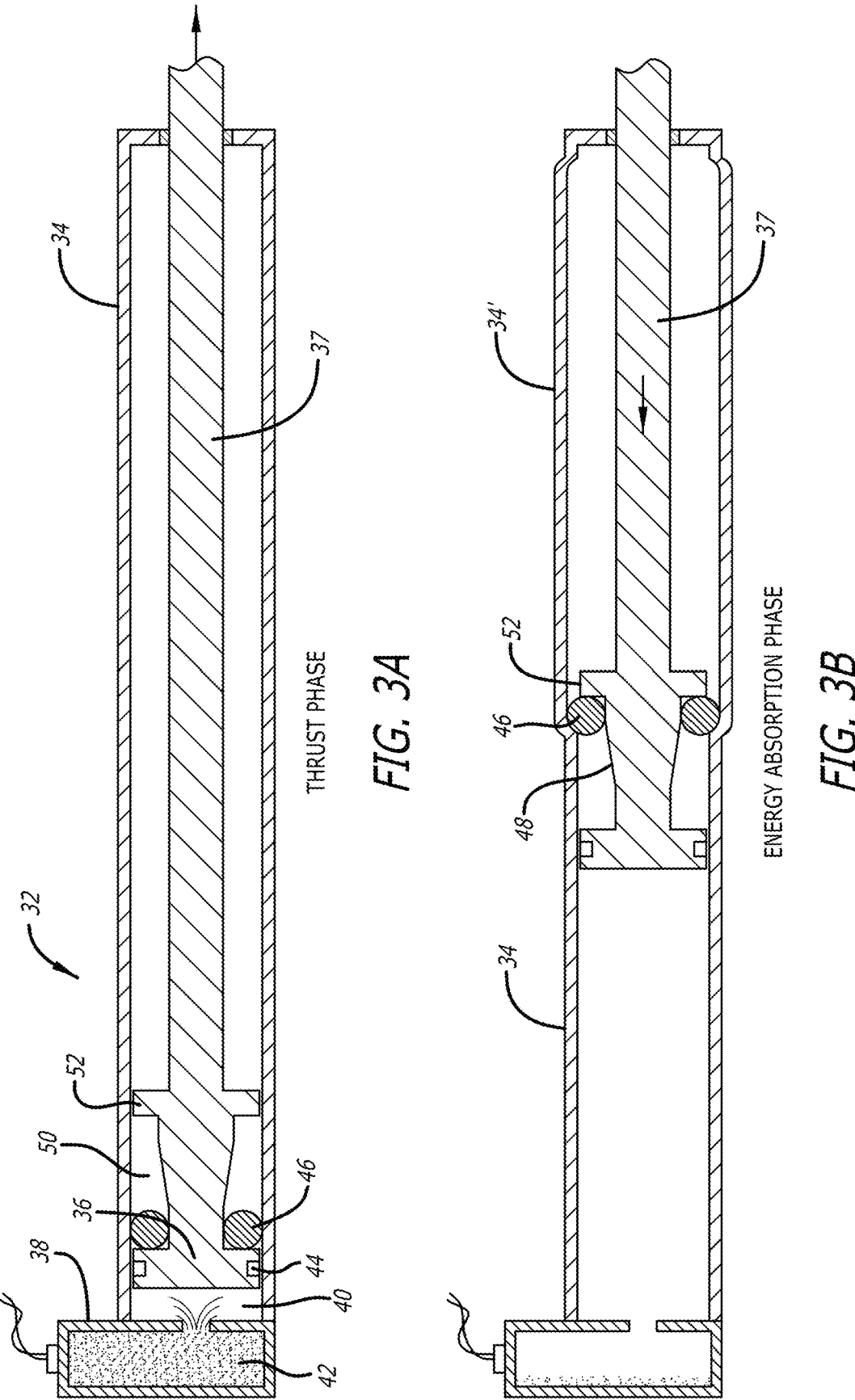
FIG. 3A is a partial sectional view of an exemplary cylinder-piston type thruster that may be utilized in the VFTS.
FIG. 3B is a view during a return energy absorption phase.

FIGS. 3A/3B, 4A/4B and 5A/5B are partial sectional views of exemplar cylinder-piston type thrusters that may be utilized in the VFTS. They may use pyrotechnic gas generating propellant (or other sources of pressurized fluid) to drive a piston.

FIG. 3A is a partial sectional view of the exemplary cylinder-piston type thruster from FIGS. 1-2, and FIG. 3B is a view during a return energy absorption phase. As mentioned, a cylinder 34 has an inlet 38 at a first end which in this configuration contains a quantity of propellant 42. The type of propellant may be the same that is used to inflate vehicle airbags, which have evolved over the years and may be guanidinium nitrate. The propellant may be in pellet, wafer or powder form and is ignited through electrical charge or spark, as schematically indicated by wires at the top of the inlet 38.

The piston 36 and rod 37 has a first sealed end with peripheral seals 44 that faces the inlet 38. Propellant gas entering the chamber 40 thus acts on the left face of the first sealed end of the piston 36 to propel the piston and rod 37 to the right. A plurality of braking bearings 46 are provided in a space 50 formed between the sealed end of the piston 36 and a stop flange 52 on the piston 36 that extends outward toward the inner walls of the cylinder 34. The number of braking bearings 46 may vary, depending on their diameters relative to the space 50, but is preferably enough so that they are generally evenly distributed around the periphery of the piston 36.

FIG. 3A indicates firing of the propellant 42 and initiation of rightward movement of the piston 36. The braking bearings 46 are sized so as to roll freely within the space 50 as a piston 36 moves to the right, and they are pushed along by the inner face of the piston 36.

Eventually, as will be clearer below, rightward movement of the piston 36 halts and its connection with the seat framework 28 causes the piston to move back to the left, as seen in FIG. 3B. Working against this movement is the residual pressure from the expanded propellant gases within the chamber 40, which can be supplemented by providing the braking bearings 46. Namely, as the piston 36 moves to the left, the braking bearings 46 are forced radially outward by a cam ramp 48 formed on the piston 36. Due to the close spacing between the braking bearings 46 and the inner wall of the cylinder 34, an interference is created. As the piston 36 is forced to the left, the braking bearings 46 are trapped between the cam ramp 48, the stop flange 52, and the inner wall of the cylinder 34. The relative diameter of the braking bearings 46 is calibrated so that the interference creates a frictional deceleration of the piston 36, as opposed to outright binding. During this energy absorption phase, movement of the piston 36 causes the braking bearings 46 to deform the cylinder outward, such as seen in the region 34'.

The energy absorption system may also be provided by small holes provided in the chamber 40 of the cylinder that vent pressurized gas from the cylinder from forward movement of the vehicle seat along the track or rail; that is, opposite the direction of the predicted crash forces.

The seat's forward movement ultimately slows and stops at the culmination of the crash event at which point the seat is desirably then held stationary relative to the vehicle by means of a brake or other type of locking device. That is, residual pressure may remain in the chamber 40 which might otherwise begin to again push the seat rearward. Consequently, a solenoid or ratcheting system may be incorporated to prevent such secondary rearward movement and protect the vehicle occupants. For example, the track or rail system on which the seat 20 is propelled backward may be coupled to a set of ratcheting teeth which initially permit rearward movement of the seat, but which engage after the seat starts moving forward. The seat is permitted to move forward as far as the crash pulse accelerations take it, but further rearward movement is prevented.

Figures 4A, 4B:
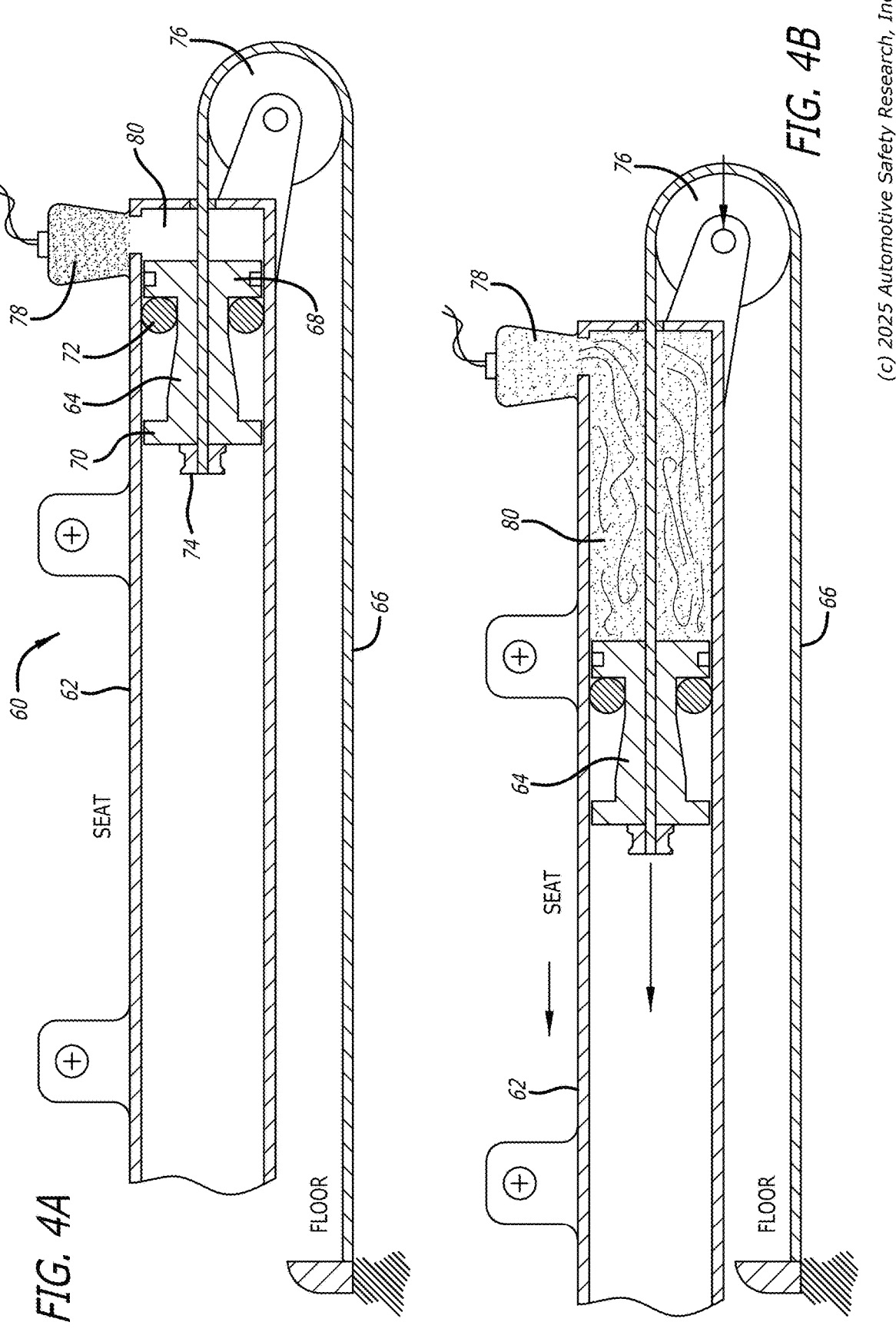
FIG. 4A is a partial sectional view of an exemplary cylinder-piston type thruster that utilizes a cable pulley system.
FIG. 4B is a view showing a 2:1 mechanical advantage during an actuation phase.

FIGS. 4A and 4B are partial sectional views of an exemplary cylinder-piston type thruster 60 that utilizes a cable pulley system. FIG. 4B is a view showing a 2:1 mechanical advantage during the actuation phase. The cylinder-piston thruster 60 is similar to the thruster 32 described above in that it includes an outer cylinder 62 defining a cavity within which a piston 64 linearly reciprocates. Instead of having a piston rod and acting to push the seat rearward, the piston 64 is tethered to a flexible cable 66 which pulls the seat rearward. The piston 64 has a first sealed end 68 spaced from a stop flange 70, with braking bearings 72 arranged in a space therebetween as before. The cable 66 extends through a central bore within the piston 64 and is anchored by a fitting 74 on the left side of the stop flange 70.

In contrast to the first embodiment of FIG. 3A, the cylinder 62 of FIG. 4A is fixed to the seat instead of to the vehicle floor, and a mechanical advantage is achieved. Specifically, the cable 66 extends through a sealed bore out of the right end of the cylinder 62 and wraps around a pulley 76 fixed with respect to the cylinder 62. The cable 66 then extends to the left and affixes to the floor or at least framework mounted on the floor. Also in contrast to the first embodiment, the thrust direction of the seat is to the left.

A source of pressurized gas such as a propulsive compartment or capsule 78 that opens to a chamber 80 between the first sealed end 68 of the piston and the right end of the cylinder cavity. Upon ignition, as seen in FIG. 4B, propulsive gases into the chamber 80 and propel the piston 64 to the left. As the piston 64 moves leftward within the cylinder 62, the seat also moves left because of a fixed length of the cable 66. However, due to the mechanical advantage provided by the pulley 76, the seat only moves half the distance that the piston 64 moves, as indicated by the different lengths of the movement arrows. This requires a longer length of travel for the piston 64 for the same amount seat movement as the embodiment in FIG. 3A, but produces a proportionally greater propulsive force. Depending on the space available under the seat, this solution may be preferable to the vehicle manufacturer. Additionally, the cable system precludes potential piston rod buckling.

Figures 5A, 5B:
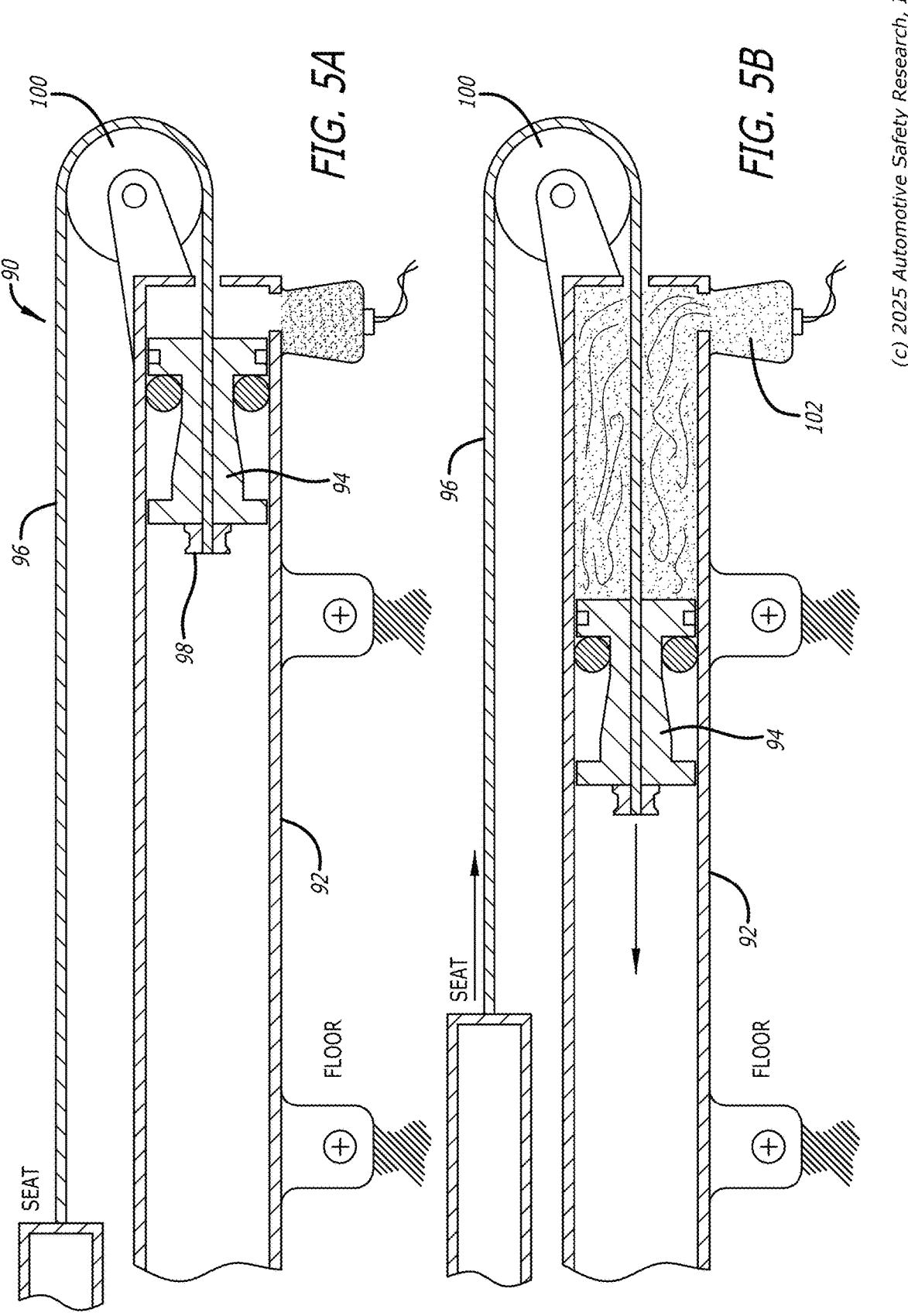
FIG. 5A is a partial sectional view of another cylinder-piston type thruster that utilizes a cable pulley system without a mechanical advantage.
FIG. 5B is a view during an actuation phase.

FIG. 5A is a partial sectional view of another cylinder-piston type thruster 90 that utilizes a cable pulley system without a mechanical advantage. FIG. 5B is a view during a thrust or actuation phase. Again, the thruster has a cylinder 92 in which a piston 94 reciprocates. As with the cylinder-piston type thruster 60 described above, the piston 94 moves to the left during the thrust phase, but in this case the cylinder 92 is affixed to the floor of the vehicle and the seat moves to the right. Namely, a flexible cable 96 extends through the piston 94 and is affixed on the left side thereof by a fitting 98. The cable 96 extends through a sealed bore on the right end of the cylinder 92 and wraps around a pulley 100. The cable 96 then continues to the left and affixes to the seat or framework thereof.

FIG. 5B indicates ignition of propulsive gases into the cylinder from a propulsive compartment or capsule 102 which sends the piston 94 to the left. The cable 96 then pulls the seat to the right by the same distance. This arrangement may be preferable for situations when space is limited, or piston rod buckling is a concern. No mechanical advantage is provided by the second embodiment thruster 90 seen in FIGS. 5A & 5B.

The seat's forward movement restraining force (Force Limiting) may be accomplished by way of a mechanical interference mechanism as shown in FIGS. 3-5, or by other means such as a hydraulic or pneumatic mechanism, or other such mechanism that creates resistance to the seat's final phase of movement.

The rolling metal bearings shown in FIGS. 3-5 are designed as Force Limiting energy absorbing mechanisms to further decelerate the seat after reaching its maximum initial translation. The seat will ultimately reverse its direction relative to the vehicle in response to the vehicle Crash Pulse. In this example the ball bearings roll freely as the seat initially moves rearward, but upon reversal of direction they create a high restraining force (as shown in FIG. 3B at 34') to further absorb occupant kinetic energy during forward movement. FIGS. 4A-4B is an exemplar embodiment that utilizes a pulley system that effectively doubles the applied seat force but requires twice the piston travel.

Figure 6:
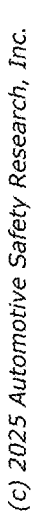
FIG. 6 is a graphical representation of hypothetical occupant injury mitigation when the disclosed system described herein is utilized in a 35 mph barrier crash.

FIG. 6 is a graphical representation of hypothetical occupant injury mitigation when the disclosed system described herein is utilized in a 35 mph barrier crash. Conceptual occupant chest Gs are overlaid against actual Tesla Model S crash test data. This hypothetical shows a reduction in chest acceleration from 49 Gs to 20 Gs.

Figure 7:
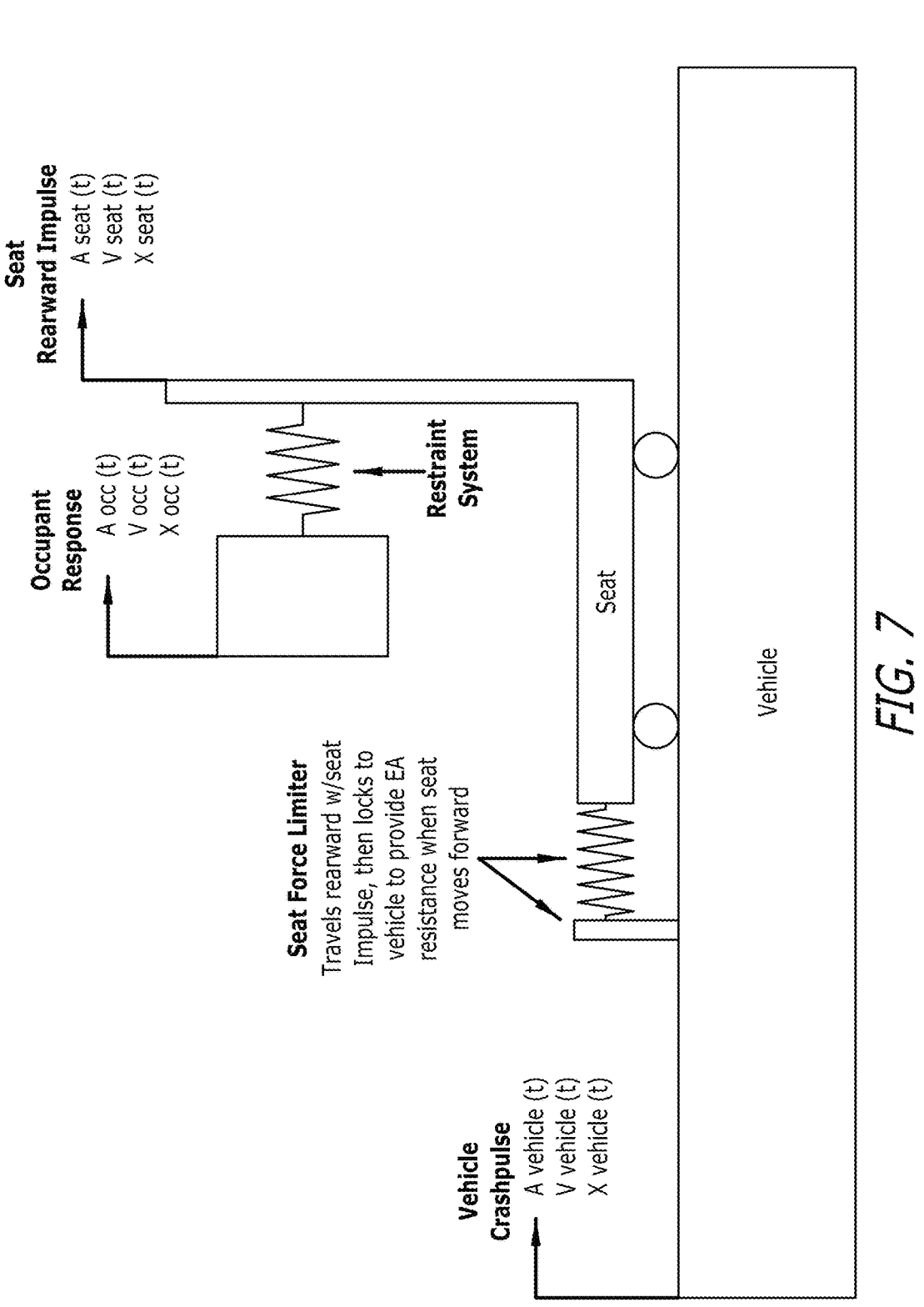
FIG. 7 is a simplified schematic representation of the concept of the disclosed system showing conceptualized components, forces and accelerations associated with a head-on vehicle crash, with various movement systems and their force vectors indicated.

FIG. 7 is a simplified schematic representation of the concept of the disclosed system showing conceptualized components, forces and accelerations associated with a head-on vehicle crash, with various movement systems and their force vectors indicated. This conceptualization served as a basis for a proof of concept computer simulation of the disclosed system. The computer simulation was used to determine the viability of the disclosed system as well as appropriate Precrash Pulses, timing and Force Limiting for various Crash Pulses and to calculate predicted occupant impact response. It validated the ability of the system to dramatically reduce injury measures.

Figure 8:
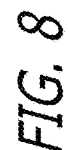
FIG. 8 shows a graph of the occupant chest accelerations predicted by the computer simulation program for two 30 mph Delta V simulations, one with and the other without the disclosed system.

FIG. 8 shows a graph of the occupant chest accelerations predicted by the computer simulation program for two 30 mph Delta V simulations, one with and the other without the disclosed system.

The computer simulations presented in FIG. 8 utilized an 8 kN average rearward thrust beginning 70 ms prior to the TOI. This simulation validates the systems described herein. It predicts and demonstrates a reduction of peak occupant chest accelerations from 30 Gs without the disclosed system to about 12 Gs with the disclosed system.

Figure 9:
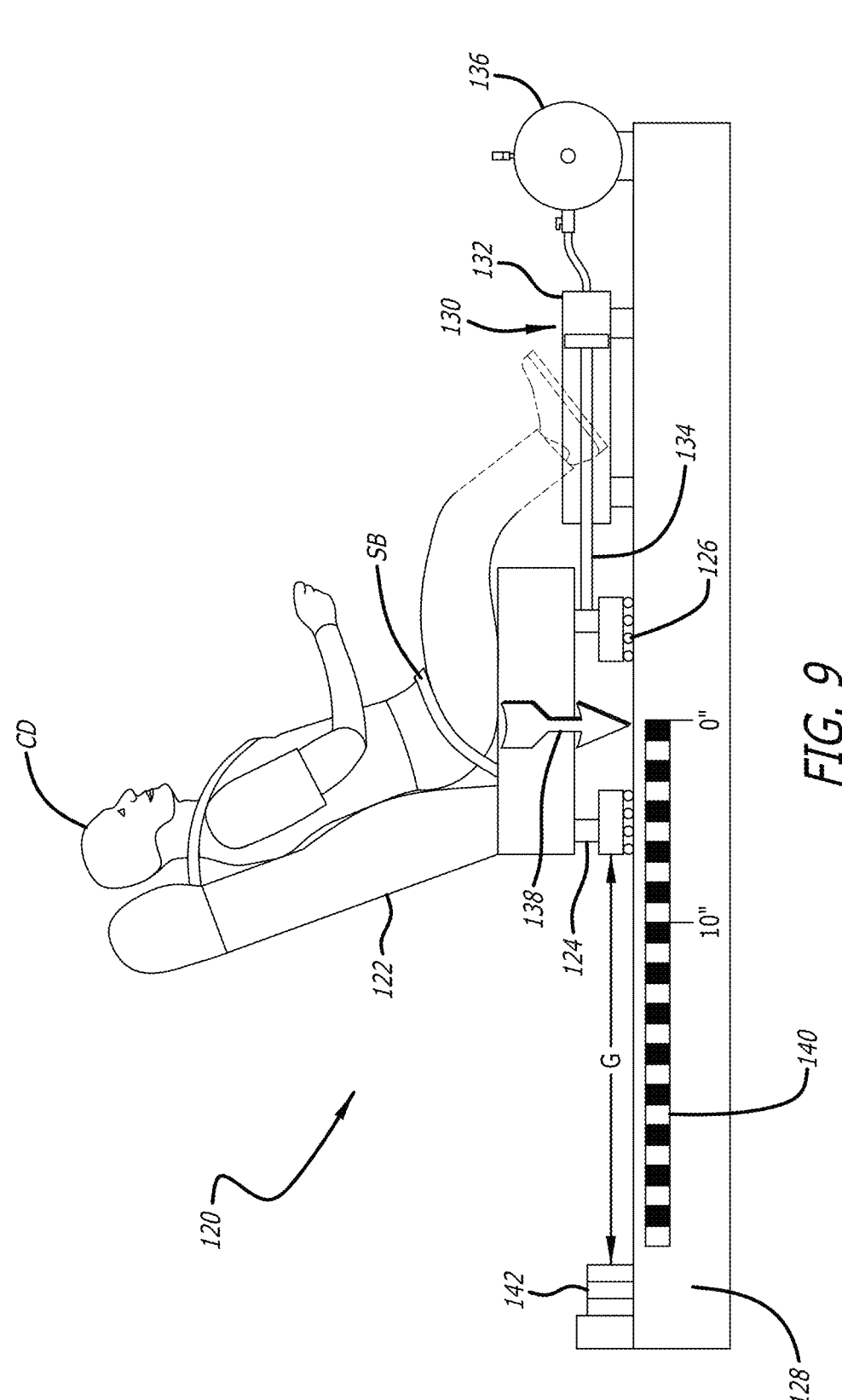
FIG. 9 shows a testing device for a proof of concept test utilizing stored gas and a pneumatic cylinder to provide a type of VFTS.

Subsequent to the proof of concept computer simulations, a full-scale embodiment of the systems described herein was fabricated and crash tested. FIG. 9 shows this embodiment as a testing system 120 utilizing stored gas and a pneumatic cylinder to provide a type of VFTS. This test device does not necessarily represent the disclosed system, as it would be implemented in an actual vehicle, but rather uses dual rail tracks, a single cylinder VFTS, and large air reservoir to allow adjustable gas pressures, short turnaround time, repeatability and reusability for multiple tests. A system in a vehicle would be similar but most likely utilize an explosive propellant for the thrusters, such as illustrated above with respect to FIGS. 3-5.

The system 120 features an actual size vehicle seat 122 on which a crash dummy CD is supported and restrained by a common seatbelt SB. The seat 122 mounts on seat framework 124 which is arranged on bearings 126 on a track or rail (not shown) mounted on a simulated vehicle floor framework 128. A cylinder-piston type thruster 130 or VFTS is positioned in front of the seat 122. The thruster 130 includes a cylinder 132 within which reciprocates a piston and piston rod 134. The piston rod 134 projects in a rearward direction out of the cylinder 132 and connects to a front portion of the seat framework 124. A compressed air tank 136 connects to the internal chamber of the cylinder 132 enabling rapid pressurization therein and thus rapid movement of the piston rod 134 in a rearward direction. With this simulated system 120, the seat 122 and crash dummy CD thereon can be rapidly accelerated in the rearward direction.

An enlarged indicator arrow 138 has been superimposed on the seat 122 pointing downward toward a linear scale 140. The black and white squares represent inches extending in a rearward direction from the arrow 138. A crash absorbing block 142 is mounted on the floor framework 128 behind the seat 122 to provide a limit to rearward travel thereof. A gap G between the rear edge of the seat framework 124 and the crash absorbing block 142 also indicates the amount of travel of the seat in a rearward direction.

Figure 10:
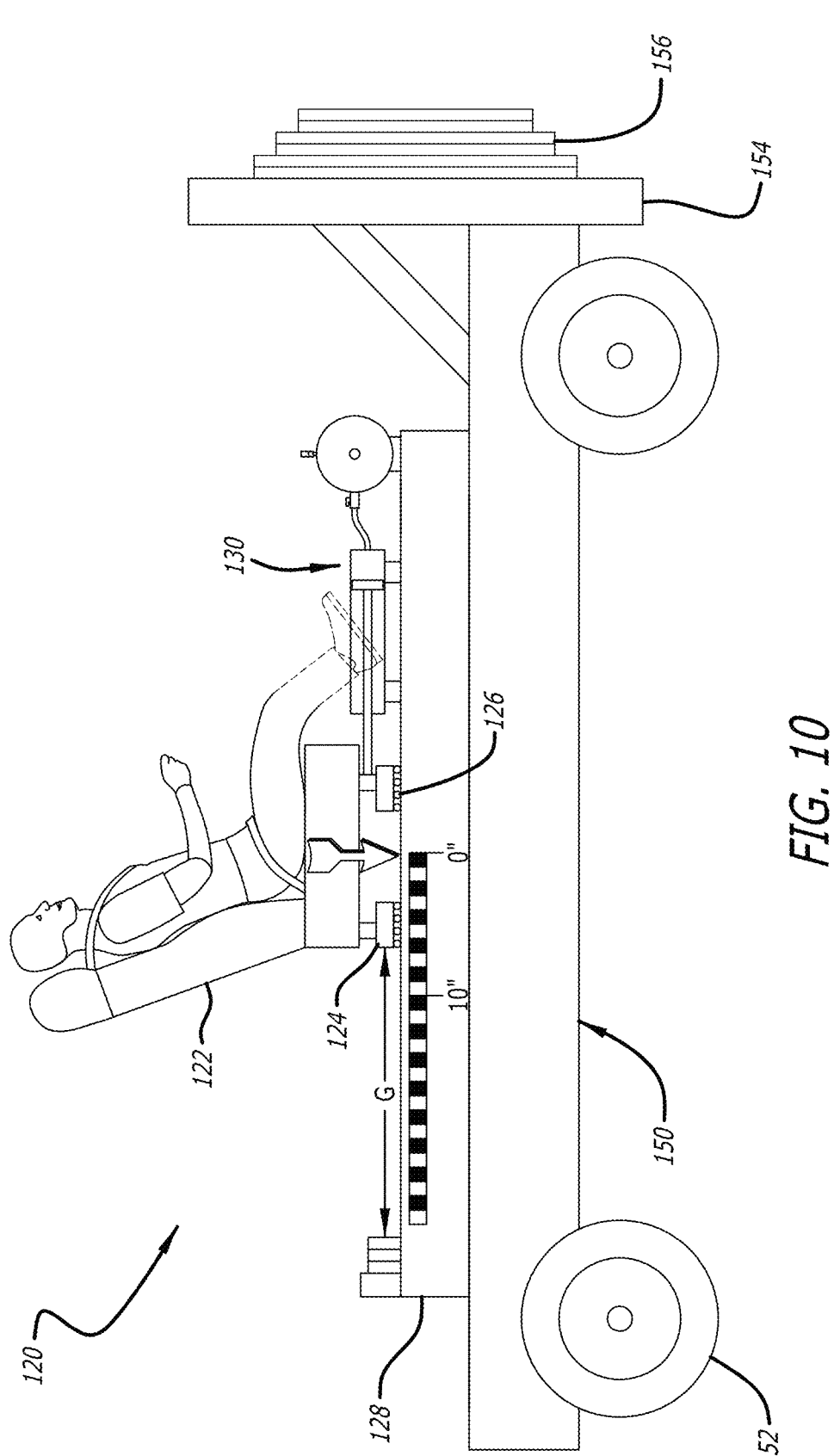
FIG. 10 shows the system mounted on a full scale test carriage (also known as a sled) at a vehicle testing facility.

FIG. 10 shows the crash testing system 120 mounted on a full scale test carriage 150 on wheels 152 (also known as a sled) for use at a vehicle testing facility. The Anthropometric Test Device (ATD), also referred to as a Crash Test Dummy, was an Instrumented 50th Percentile Hybrid III Male. The test carriage 150, which is impacted into a rigid barrier, has a rigid front-end bumper 154 that utilizes a hexcell energy absorbing front end 156 to simulate the crash deformation and Crash Pulse characteristics of an actual vehicle impact. The hexcell material produces a Crash Pulse that approximates an actual vehicle barrier crash of approximately 100 ms in duration. The test carriage is very similar to what is known as a Moving Deformable Barrier (MDB), a device prescribed by the National Highway Traffic Safety Administration (NHTSA) for various testing.

Baseline Tests WITHOUT the disclosed system were run with 18 and 30 mph Delta V Crash Pulses. The Baseline tests allowed comparison with data from tests of the disclosed system. Tests with the disclosed system were conducted at Delta V Crash Pulses of 18, 24 and 30 mph. These barrier crash tests demonstrated a remarkable improvement in occupant chest Gs over the Baseline tests. At 18 mph Delta V, chest Gs dropped from 22 Gs to 9 Gs and at 30 mph, from 30 Gs to 12 Gs. In the 30 mph test utilizing the disclosed system, the Precrash Pulse was initiated at approximately 70 ms prior to the onset of the impact with the barrier.

Figure 11:
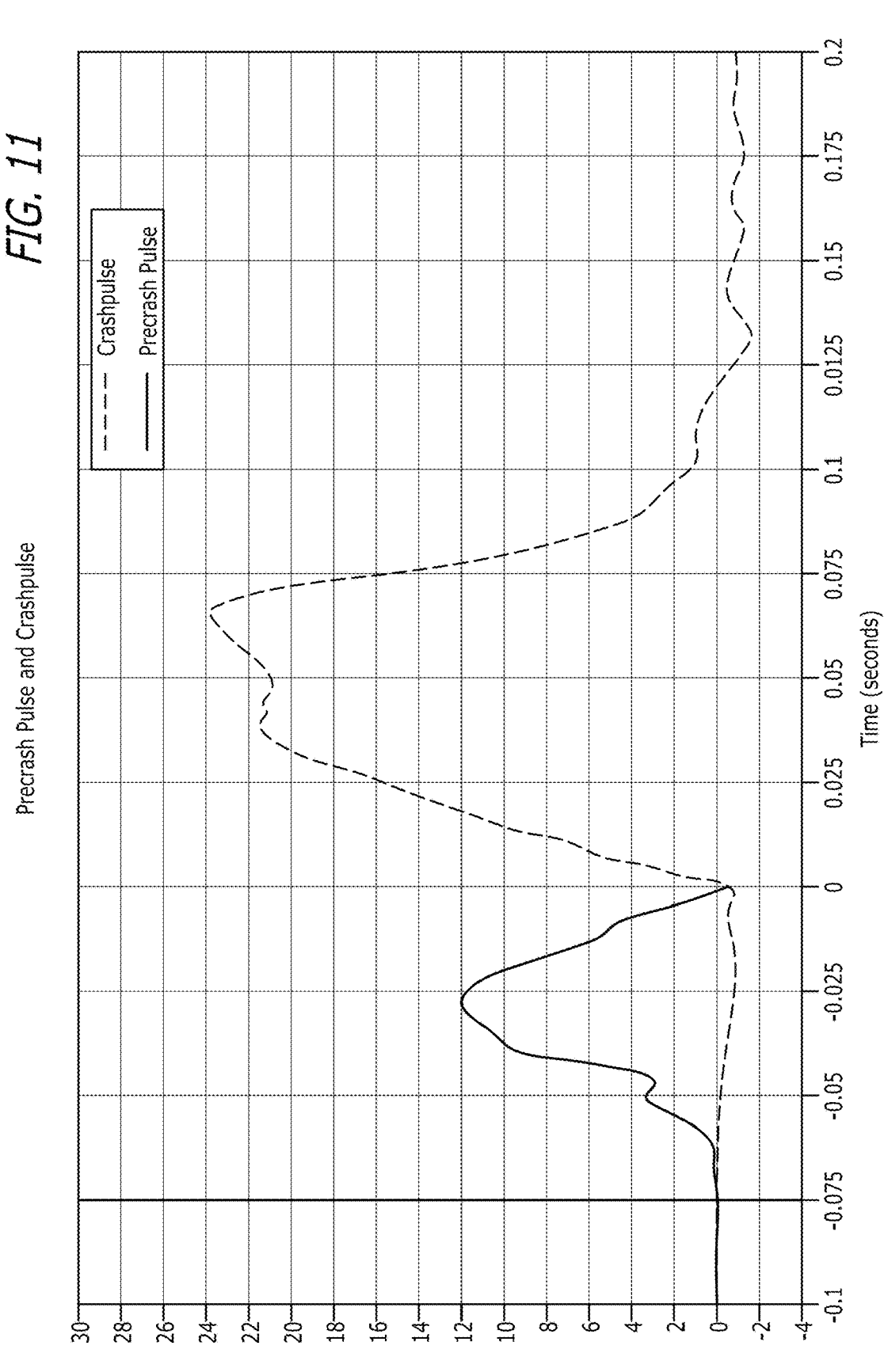
FIG. 11 is a graph of the strategic shape and timing of the Precrash Pulse relative to the test carriage Crash Pulse for the 30 mph Delta V test.

FIG. 11 is a graph of the strategic shape and timing of the Precrash Pulse relative to the test carriage Crash Pulse for the 30 mph Delta V test. Comparison of the results of the two 30 mph tests demonstrate outstanding improvements in occupant injury measures.

FIGS. 12A, 12B, 12C, and 12D show four important phases of the 30 mph test in which the disclosed system was utilized.

Figure 12A:
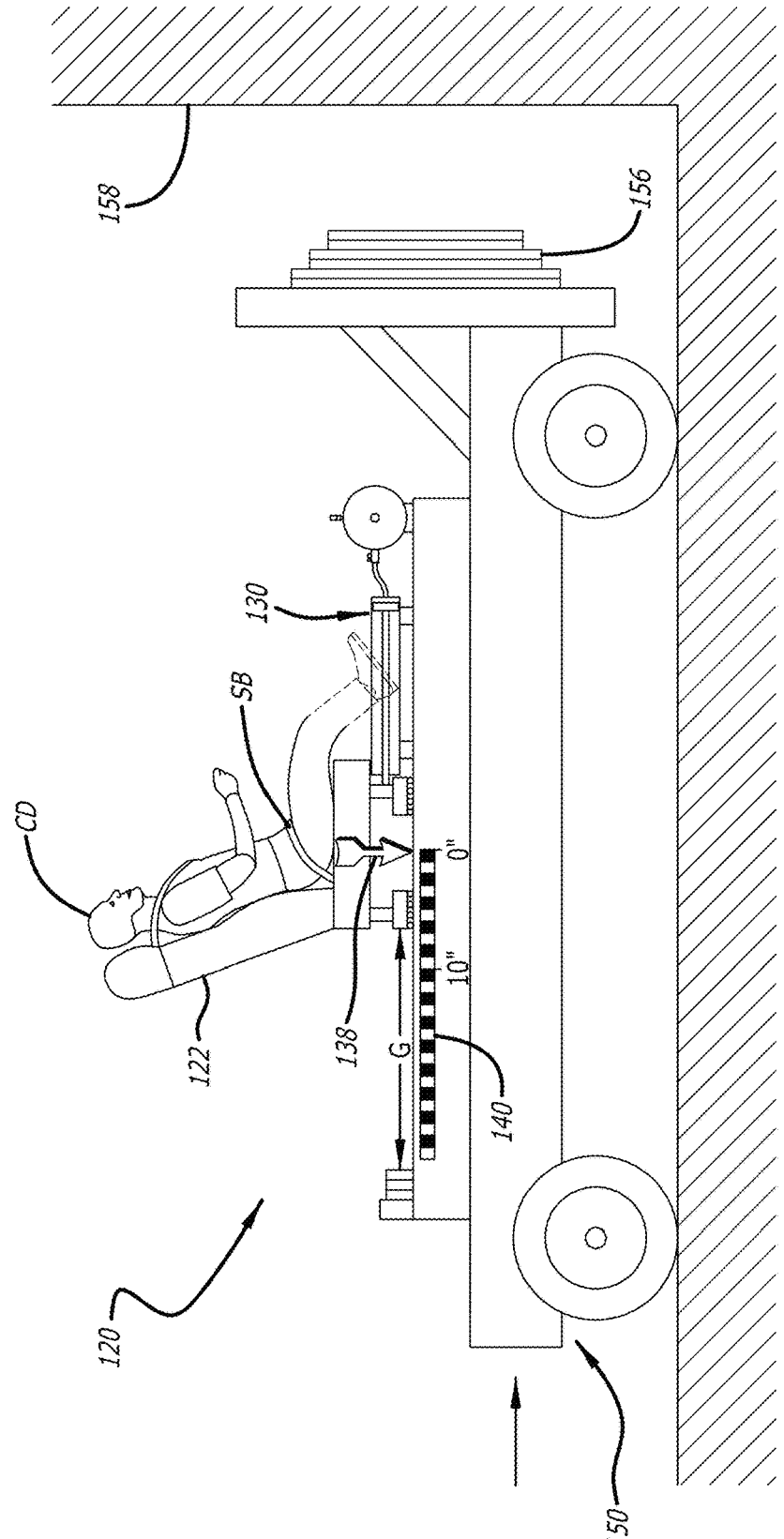
FIGS. 12A-12D show four important phases of the 30 mph test in which the disclosed system was utilized.

FIG. 12A shows the seat 122 and ATD or crash dummy CD at about 50 milliseconds (msec) before the barrier impact (T=−50 ms). The seat 122 had not moved noticeably rearward relative to the test carriage at this point in time, shown by the arrow 138 at 0 inches on the scale 140, although the VFTS 130 had already been initiated by releasing pressurized gas through an electrically activated valve 20 ms prior to this point. The timing is important, because it is imperative that the VFTS 130 commence the process of moving the seat 122 rearward before the actual crash impact.

Figure 12B:

FIG. 12B shows the seat 122 and crash dummy CD at the Time of Impact (TOI), also referred to as "Time Zero" (T=0). The energy absorbing front end 156 has just contacted the wall 158, and remains intact. The Precrash Pulse from the VFTS thruster 130 has moved the seat about 5 inches rearward at this point in the event, and the crash dummy CD has begun to articulate forward relative to the seat 122 due to the rearward acceleration imparted to the seat.

Figure 12C:
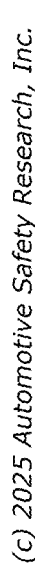

FIG. 12C is at 40 msec after Time Zero (T=+40 ms). The energy absorbing front end 156 starts to crumple, simulating the front end of an actual car crumpling. The seat 122 has translated to its maximum rearward excursion of about 9 inches relative to the test carriage or simulated floor framework 128, and is about to reverse direction. The strategic timing of the Precrash Pulse has allowed the test carriage Crash Pulse to slow the seat and reverse its direction relative to the test carriage. It is noteworthy that at this point in time the seat and the test carriage have reached a common velocity.

Figure 12D:
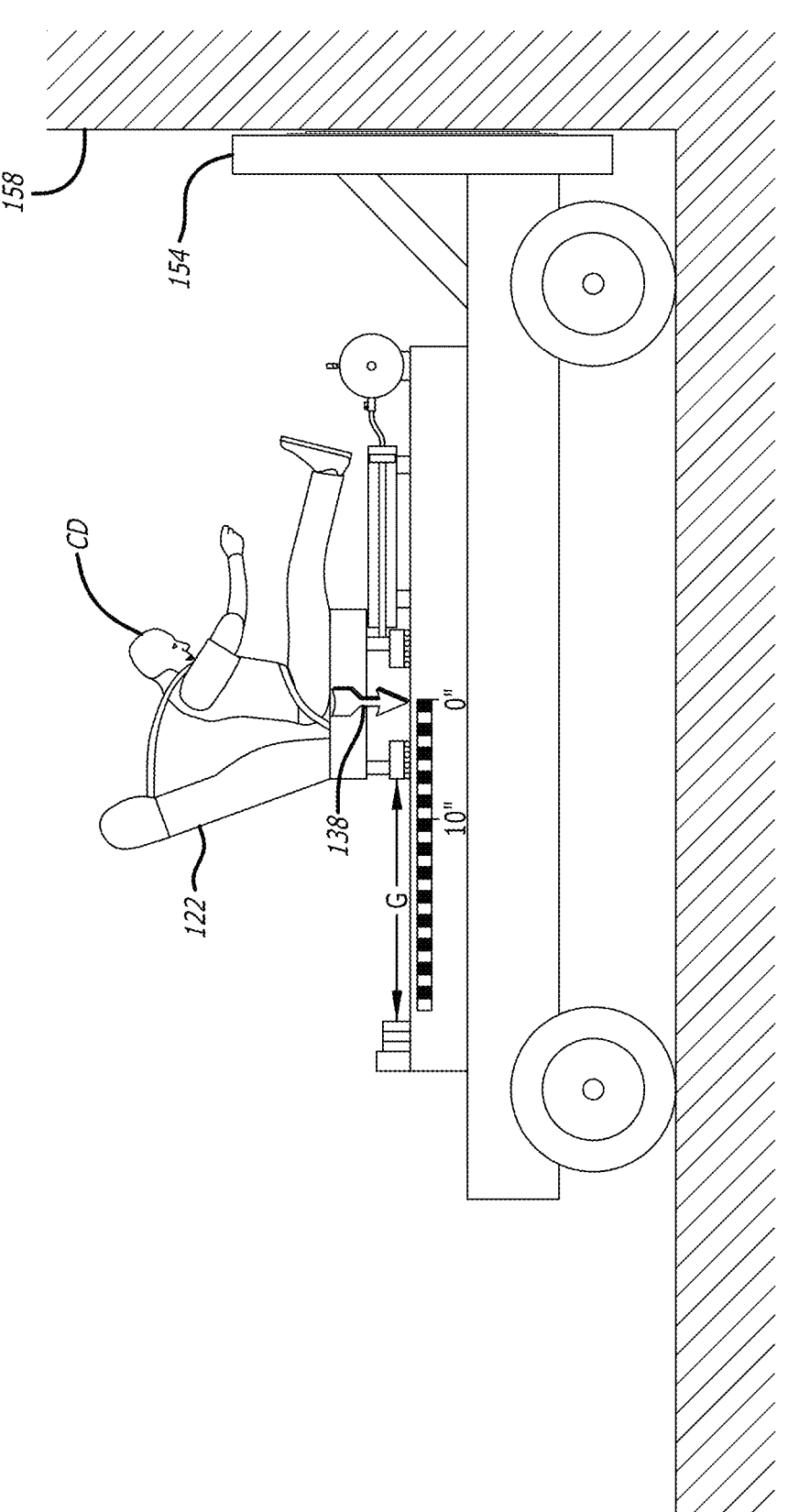

FIG. 12D shows the final phase of the crash. At 160 msec the crash is essentially over, and the seat 122 has returned to its approximate initial position, after first traveling 9 inches rearward relative to the test carriage and then reversing direction under the influence of the Crash Pulse and traveling 9 inches forward relative to the vehicle. In this last phase of movement, the seat translation was resisted by the pneumatic cylinder-piston which provided Force Limiting as the seat moved forward. This is similar to the braking bearings within the system as previously shown in FIGS. 3-5, and results in further occupant energy absorption. From the highway reference frame, the vehicle occupant continually slows during both directions of seat travel to greatly increase the effective stopping distance and reduce occupant injury measures.

Figure 13:
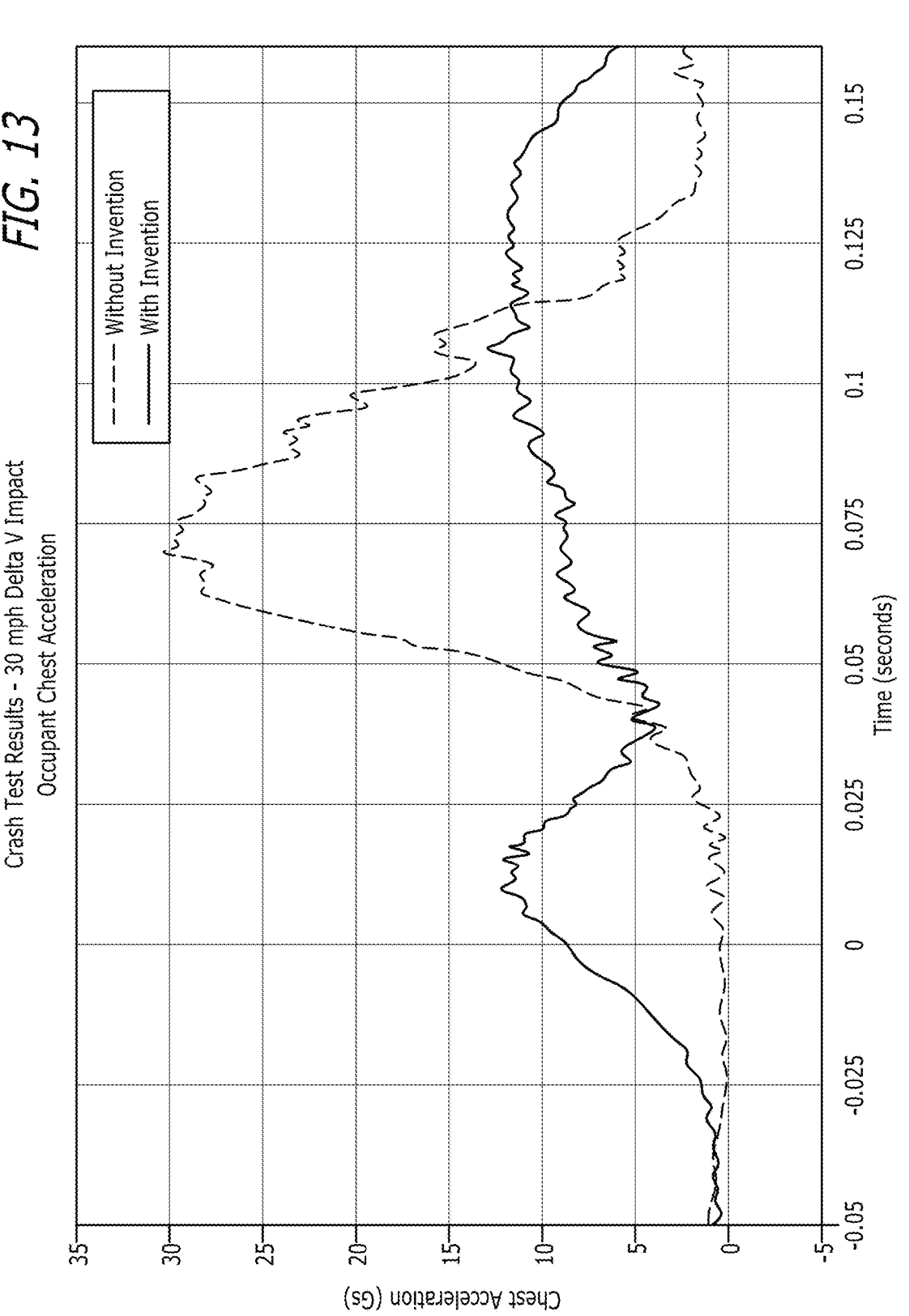
FIG. 13 is a graph that compares the crash dummy (ATD) chest accelerations for the 30 mph Baseline test in which the disclosed system concept was not utilized and the subsequent 30 mph test in which the disclosed system concept was utilized.

FIG. 13 shows the dramatic improvement achieved with the utilization of the disclosed system concept. It presents the crash dummy (CD) chest accelerations for the 30 mph Baseline test in which the disclosed system concept was not utilized and the subsequent 30 mph test in which the disclosed system concept was utilized. The crash dummy's chest accelerations are expressed in Gs. The dashed curve shows the chest Gs for the test WITHOUT the VFTS (Baseline) and the solid curve shows the Chest Gs WITH the VFTS activated. It was noted that the results were remarkably similar to those predicted by the proof of concept computer simulation as presented in FIG. 8. The utilization of the disclosed system concept reduced the peak ATD chest Gs by about 60 percent, from 30 Gs to about 12 Gs.

This phase of crash testing indicates that using the embodiment of the disclosed system described herein can very well be expected to reduce occupant chest accelerations by well over 50%, for a wide range of frontal accident speeds.

Considering that occupant kinetic energy increases as the square of the velocity, the 30 mph test represented almost three times the energy as the 18-mph test. Remarkably, the ATD Chest Gs at 30 mph with the disclosed system were substantially lower than at 18 mph without the disclosed system (12 Gs vs 22 Gs). This amounts to the disclosed system rendering a 30 mph collision substantially less severe than an 18 mph collision.

General Principles:

The Acceleration of the seat is accomplished by means of a Variable Force Thruster System (VFTS). For this purpose, the VFTS may be designed for example as a pyrotechnic, pneumatic and/or hydraulic cylinder unit, a gas generator, an electro-mechanical device, a spring energy storage, or any another suitable actuator and/or energy storage system. Although a pneumatic system was used for testing purposes, a pyrotechnic piston/cylinder arrangement is most likely to be used in vehicles. Alternatively, modern electric cars possess extremely powerful batteries which can be used for short bursts to power solenoids or other electro-mechanical devices for this purpose. The forcefulness of the translational or other directional accelerator thruster may be precisely adjusted, depending on the predicted severity of the impending collision. In higher severity collisions, a more forceful acceleration of the seat is utilized. In lower severity collisions a less forceful acceleration of the seat is utilized.

The forcefulness of the VFTS may also be adjusted depending on other factors. Such factors may include, but not necessarily be limited to, occupant biometrics such as weight, height, gender, age, and other such biometric parameters.

The timing and magnitude of the seat thrust is critical and is optimized based on the predicted timing and severity of the impending collision. Therefore, the seat thruster system is triggered within an optimum time window prior to the impact. The onset of the vehicle collision accelerations (Crash Pulse) overlaps the motion of the thrusted seat. The triggering time is optimized such that the movement of the seat works in concert with the vehicle Crash Pulse to reduce the occupant accelerations over the course of the event.

It is envisioned that the seat is mounted on a rail or seat track system on which the seat translation takes place. As an example, If a frontal collision is imminent, as detected by a Crash Prediction System, the VFTS is triggered by means of the control unit, so that the seat is accelerated rearward on the rails. The amount of rearward seat movement may vary, depending on the timing and forcefulness of the VFTS in conjunction with the vehicle Crash Pulse. A maximum amount of rearward movement is constrained to a preset limit based on Occupant and Vehicle dimensions.

Once the seat translation has reached a maximum for a given crash situation, the seat is then enabled to reverse direction and move under the influence of the remaining crash forces and a restraining force mechanism. This movement restraining force serves to further dissipate the occupant's energy in a way that reduces the accelerations and forces imparted to the occupant. The restraining force mechanism may be integrated into the device that serves as the seat VFTS or may also be accomplished by a separate Energy Absorption mechanism.

The degree of seat Force Limiting is varied based on the predicted crash severity. Occupant biometrics may also be used in the determination of the appropriate level of Force Limiting for a given crash situation. For higher severity collisions, the applied Force Limiting will be higher. For lower severity collisions, the applied Force Limiting will be lower. At the completion of the seat's final movement, the seat is then held stationary relative to the vehicle by means of braking bearings or other type of locking device.

For clarity, the concept of the disclosed system will primarily be discussed in terms of a frontal collision, although it is contemplated that it may also be applied to other crash modes. The system disclosed herein is different from all Prior Art in that the actuation of the controlled Precrash Pulse is strategically timed to WORK IN CONCERT with the vehicle Crash Pulse to efficiently absorb occupant energy throughout the rearward and subsequent forward movement of the seat relative to the vehicle. In practice, as the Precrash Pulse propels the seat and occupant rearward relative to the vehicle, and before the seat reaches its limit of rearward travel, the influence of the vehicle Crash Pulse slows and reverses the seat and occupant's direction of travel relative to the vehicle. Both the Precrash Pulse and vehicle Crash Pulse influence the seat in the same vector direction.

By way of analogy, just as a skier can pre-jump a mogul to reduce impact, the disclosed system starts the occupant crash accelerations early and thus reduces otherwise injury causing high G accelerations later in the event.

Another simplified analogy of the disclosed system is that of a theoretical person speeding downward in a falling elevator. Just before the elevator hits bottom, the person jumps up and thus changes their velocity/acceleration relative to the outside world, so that the effects the elevator's impact with the ground are mitigated. The timing and magnitude of the jump are thus crucial. If they jump too soon, they may hit the ceiling of the elevator. If they jump too late, they have already experienced the full impact.

The concept is also somewhat similar to a ball, that thrown upward will slow and reverse direction under a gravitational acceleration vector of constant direction (one G). Similarly, the disclosed system uses Precrash Pulse and Crash Pulse acceleration vectors of constant direction to first thrust the seat rearward and then slow and reverse seat translation relative to the vehicle.

Computer simulations and vehicle crash testing of the disclosed system were employed to-demonstrate that a properly timed Precrash Pulse typically should initiate within the 100 milliseconds (ms) just prior to the onset of the crash. The optimum initiation of the Precrash Pulse within that 100 ms window is dependent on the severity and nature of the predicted vehicle Crash Pulse. Preferably, the Precrash Pulse is initiated within 20-100 ms and perhaps between 50-100 ms of the predicted onset of the crash, though is contemplated that some Crash Pulses may call for actuation of the Precrash Pulse somewhat in excess of 100 ms. This new and innovative concept has demonstrated a capability of reducing occupant Gs by more than 50%.

Benefits:

The disclosed system benefits the occupant in several significant ways. First, the system is designed so that, during the initial rearward seat propulsion, the occupant gets a headstart in reducing their impact speed.

Second, during the subsequent phase of forward seat movement, the occupant benefits from lower accelerations as their energy is further dissipated by Force Limiting drag on the seat.

Third, the occupant is moved out of the path of deploying Airbags and away from potential crash deformation into the occupant compartment and/or from objects that may intrude into the occupant compartment.

Fourth and very significant, with early firing of the seat Precrash Pulse, the occupant preloads the seatbelt and removes slack. This greatly benefits the occupant from the phenomenon known as "Ridedown". Ridedown is a Term of Art that relates to the degree to which the occupant is coupled to the vehicle and thus benefits from utilizing the vehicle structural deformation to increase the distance over which their energy is dissipated.

Additional Benefits:

Timely application of the Precrash Pulse moves the occupant rearward and away from deploying airbag restraint systems. The occupant will be at less risk of Inflation Induced Injuries when the airbags are subsequently deployed.

Vehicles will be able to more easily pass and exceed the Federal Motor Vehicle Safety Standards (FMVSS) and perform much better in New Car Assessment Program (NCAP) testing, as well as other vehicle safety standards. This disclosed system will significantly raise the level of crash severity survival expectancy.

In addition, the disclosed system concept proved highly effective in reducing occupant injury measures (e.g., chest G's) in full scale crash testing at 15, 20 and 25 mph barrier impact speeds (resulting in 18, 24, and 30 mph Delta Vs, respectively).

The disclosed system dramatically reduces the effective acceleration pulse to the occupant seat. It will therefore reduce crash forces and injury measures to other injury prone body parts such as the head, neck, femur, etc.

The disclosed system described herein, once installed in highway vehicle is predicted to dramatically reduce injuries and death in frontal collisions.

Proof of Concept Modeling:

Concepts explored, assumptions made:

As a proof of concept, computer modeling has been conducted in which the following assumptions, constants and variables were considered as they relate to a frontal impact.

1. Thrust seat rearward prior to impact
2. Maximum allowable rearward travel depends on the vehicle geometry and occupancy of rear seats. However, it is envisioned that 12" will be a reasonable estimate.
3. Ideally, the VFTS is timed such that the vehicle velocity catches up to seat velocity prior to seat reaching maximum travel.
4. After the seat thrust, the seat may then reverse direction and translate against an energy absorption mechanism.
5. Restraint system modeled as a spring-mass-damper—see FIG. 7.
6. Crash pulse for modeling is a 30 mph delta haversine input.
7. Seat thrust in the computer model example is an average 8 kN force-time input.

From the computer simulation modeling, various conclusions became apparent:

1. The concept is viable: For a 30 mph Delta V haversine Crash Pulse and with a properly applied Precrash Pulse and Force Limiting, the predicted occupant chest acceleration was reduced from 30 Gs to 12 Gs, (FIG. 8).
2. The simulation model was effective in exploring a range of Precrash Pulse initiation timing. Precrash Pulse initiating times that were too early resulted in the allowable seat track rearward excursion limit to be exceeded. In practice, this would result in an abrupt stop of the seat as it reached its allowable limit, potentially leading to occupant injury such as whiplash.
3. Late Precrash Pulse initiation times, those that were too close to the onset of the Crash Pulse, were not significantly effective in reducing the occupant accelerations.

It was found that for a given Crash Pulse, and with appropriately applied PreCrash Pulse and Force Limiting, there typically exists a range of Precrash Pulse initiation times that result in similar predicted occupant accelerations. There was not a singular and highly precise initiation time that must take place, rather initiating the Precrash Pulse within a limited window of times was sufficient. This improved confidence that the disclosed system was viable in practical application.

The disclosed system concept has thus been validated by computer simulation modeling and more significantly, by full scale crash testing. It has shown the disclosed system to be capable of reducing occupant chest injury measures by more than half. By the same reasoning it is expected that other occupant injury measures such as those for the head and neck will be similarly reduced by the disclosed system.

Definition of Terms

1. "Disclosed system"—The term "disclosed system" refers to the system described herein, and is the subject of this patent. It is comprised of two major components:
   A. An apparatus capable of applying high forces to accelerate a vehicle seat and occupant in a specifically controlled manner in the context of a vehicle crash.
   B. A computer algorithm that determines the appropriate acceleration pulse applied to the seat and occupant in terms of the timing and forces that act upon the seat during its rearward and forward phases seat translation.
2. Computer Algorithm—The logic instructions used by a computer/microprocessor that dictate the timing and acceleration of the seat in terms of the forces that act upon the seat during rearward and forward phases of translation.
3. Variable Force Thruster System (VFTS)—A system capable of accelerating the seat along the track rails in a controlled manner in the direction of the vehicle crash force. In a frontal collision, this would mean moving the seat in a rearward direction relative to the vehicle. The VFTS may also incorporate a Force Limiting system as described below.
4. Force Limiting—An energy absorbing system that resists movement of the seat on the track rails in a direction opposite that of the vehicle crash force. In a frontal collision, this means that after the initial rearward movement relative to the vehicle, the seat is then allowed to move forward relative to the vehicle in a controlled manner. This forward movement provides additional energy dissipation for the occupant.
5. Crash Pulse—The acceleration-time profile that the vehicle experiences during an impact event.
6. Delta V—The change in velocity experienced by the vehicle during the impact phase as a result of the Crash Pulse. This does not include velocity change during the post-impact phase of an accident.
7. Precrash Pulse—A Force impulse applied to the seat by the VFTS that initiates prior to the onset of the Crash Pulse.
8. Precrash Pulse Timing Offset—The time duration between the initiation of the Precrash Pulse and the onset of the vehicle Crash Pulse.
9. Ridedown—A term of art in the context of automobile safety that relates to the degree of coupling that an occupant has with the vehicle during a crash and the degree to which that coupling allows the occupant's kinetic energy to be dissipated during the structural deformation of the vehicle. This is a significant concept in that the higher the degree to which the occupant is coupled or linked to the vehicle, typically by way of a crash restraint system such as a seatbelt and/or airbag, the greater the occupant will benefit from energy dissipation by way of the structural crash deformation of the vehicle.

10. Time of Impact (TOI)—The moment the vehicle impact begins. In crash testing parlance, this is typically referred to as "time zero".

11. Crash Prediction System—A sensing system (not part of the disclosed system) capable of predicting the TOI and impact severity. With this data, the severity and nature of an impending collision may be predicted and used by the disclosed system to properly determine and apply a Precrash Pulse and subsequent Force Limiting to the seat.

12. Electronic Control Unit—An electronic device that initiates the Precrash Pulse and Force Limiting.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A vehicle crash mitigation system, comprising:

a) a track or rail on which a vehicle seat can be displaced and accelerated relative to a vehicle;

b) a strategically timed variable force thruster system including a thruster configured to apply a precrash seat thrust to the vehicle seat so as to rapidly accelerate the vehicle seat and an occupant thereon along the track or rail in a direction of predicted crash forces just prior to and during a first stage of a predicted crash impact so as to reduce vehicle occupant accelerations later in the impact event;

c) a force limiting energy absorption system configured to absorb energy from movement of the vehicle seat along the track or rail opposite the direction of the predicted crash forces and initiated upon direction reversal of the seat; and d) a computer algorithm configured to calculate the timing of the precrash seat thrust actuation to between 20-100 ms before the predicted crash impact and a magnitude of precrash seat thrust and subsequent force limiting energy absorption during a crash event, and integrated to control actuation of the variable force thruster system and energy absorption system.

2. The system of claim 1, wherein there are at least three thrusters positioned under the vehicle seat in the variable force thruster system, and the magnitude of precrash seat thrust is dependent on how many thrusters are actuated.

3. The system of claim 1, wherein there is a single thruster positioned under the vehicle seat which is capable of applying varying levels of thrust force to the seat.

4. The system of claim 1, wherein the variable force thruster system includes a cylinder-piston thruster where a piston rod extends out of a cylinder and acts directly on the vehicle seat.

5. The system of claim 4, wherein the cylinder-piston thruster is pressurized by a source of pyrotechnic gas generating propellant.

6. The system of claim 5, wherein the source of pyrotechnic gas generating propellant is a propulsive compartment or capsule that opens to a chamber between a first sealed end of the piston and one end of the cylinder cavity.

7. The system of claim 1, wherein the variable force thruster system includes a cylinder-piston thruster where a piston is connected to a cable that extends out of a cylinder and wraps around a pully to extend in an opposite direction and attaches to the seat, such that movement of the piston within the cylinder pulls the cable in the direction of predicted crash forces.

8. The system of claim 1, wherein the variable force thruster system includes a cylinder-piston thruster where a piston is connected to a cable that extends out of a cylinder and wraps around a pully to extend in an opposite direction and attaches to a floor of the vehicle, and the cylinder attaches to the seat, such that movement of the piston within the cylinder pulls the cylinder in the direction of predicted crash forces with a mechanical advantage.

9. The system of claim 1, wherein the variable force thruster system includes a cylinder-piston thruster and the energy absorption system partly includes braking bearings within the cylinder-piston thruster that engage to absorb energy from movement of the vehicle seat along the track or rail opposite the direction of the predicted crash forces.

10. The system of claim 1, wherein the variable force thruster system includes a cylinder-piston thruster and the energy absorption system includes holes provided in the cylinder that vent pressurized gas from the cylinder from movement of the vehicle seat along the track or rail opposite the direction of the predicted crash forces.

11. The system of claim 1, further including a locking mechanism to stop seat motion after the seat stops moving along the track or rail opposite the direction of the predicted crash forces.

12. A vehicle crash mitigation system, comprising:

a) a strategically timed variable force thruster system including at least two thrusters both configured to apply a precrash seat thrust to the vehicle seat so as to rapidly accelerate the vehicle seat and an occupant thereon in a direction of predicted crash forces just prior to and during a first stage of a predicted crash impact so as to reduce vehicle occupant accelerations later in the impact event;

b) a force limiting energy absorption system configured to slow movement of the vehicle seat opposite the direction of the predicted crash forces and initiated upon direction reversal of the seat; and c) a computer algorithm configured to calculate the timing and how many thrusters to actuate during a crash event, wherein the timing is between 20-100 ms before the predicted crash impact and a magnitude of precrash seat thrust is dependent on how many thrusters are actuated.

13. The system of claim 12, wherein there are at least three of the thrusters positioned under the vehicle seat in the variable force thruster system.

14. The system of claim 12, wherein the variable force thruster system includes a cylinder-piston thruster where a piston rod extends out of a cylinder and acts directly on the vehicle seat.

15. The system of claim 14, wherein the cylinder-piston thruster is pressurized by a source of pyrotechnic gas generating propellant.

16. The system of claim 15, wherein the source of pyrotechnic gas generating propellant is a propulsive compartment or capsule that opens to a chamber between a first sealed end of the piston and one end of the cylinder cavity.

17. The system of claim 12, wherein the variable force thruster system includes a cylinder-piston thruster where a piston is connected to a cable that extends out of a cylinder and wraps around a pully to extend in an opposite direction and attaches to the seat, such that movement of the piston within the cylinder pulls the cable in the direction of predicted crash forces.

18. The system of claim 12, wherein the variable force thruster system includes a cylinder-piston thruster where a piston is connected to a cable that extends out of a cylinder and wraps around a pully to extend in an opposite direction and attaches to a floor of the vehicle, and the cylinder attaches to the seat, such that movement of the piston within the cylinder pulls the cylinder in the direction of predicted crash forces with a mechanical advantage.

19. The system of claim 12, wherein the variable force thruster system includes a cylinder-piston thruster and the energy absorption system partly includes braking bearings within the cylinder-piston thruster that engage to absorb energy from movement of the vehicle seat along the track or rail opposite the direction of the predicted crash forces.

20. The system of claim 12, wherein the variable force thruster system includes a cylinder-piston thruster and the energy absorption system includes holes provided in the cylinder that vent pressurized gas from the cylinder from movement of the vehicle seat along the track or rail opposite the direction of the predicted crash forces.

21. The system of claim 12, further including a locking mechanism to stop seat motion after the seat stops moving along the track or rail opposite the direction of the predicted crash forces.

* * * * *